United States Patent
Hogstedt et al.

(10) Patent No.: US 9,216,388 B2
(45) Date of Patent: Dec. 22, 2015

(54) SIMULATOR DEVICE

(75) Inventors: Robert Hogstedt, Uppsala (SE); Jan-Erik Lynga, Uppsala (SE); Perhenric Lonnberg, Uppsala (SE); Mikael Sjogren, Alunda (SE); Johan Soderstrom, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 536 days.

(21) Appl. No.: 13/380,138

(22) PCT Filed: Jun. 16, 2010

(86) PCT No.: PCT/SE2010/050672
§ 371 (c)(1),
(2), (4) Date: Dec. 22, 2011

(87) PCT Pub. No.: WO2010/151212
PCT Pub. Date: Dec. 29, 2010

(65) Prior Publication Data
US 2012/0090716 A1    Apr. 19, 2012

(30) Foreign Application Priority Data
Jun. 23, 2009   (SE) ...................................... 0950481

(51) Int. Cl.
*F15D 1/00*     (2006.01)
*B01D 63/08*    (2006.01)
*B01D 65/00*    (2006.01)

(52) U.S. Cl.
CPC .............. *B01D 63/082* (2013.01); *B01D 65/00* (2013.01); *B01D 2313/105* (2013.01); *B01D 2313/125* (2013.01); *B01D 2313/18* (2013.01); *F15D 1/00* (2013.01); *Y10T 137/877* (2015.04)

(58) Field of Classification Search
CPC ........................................................ F15D 1/00
USPC ................................. 137/883, 601.19, 599.14
See application file for complete search history.

(56) References Cited

U.S. PATENT DOCUMENTS 3,615,257 A * 10/1971 Frost et al. .................... 422/534
4,846,970 A    7/1989 Bertelsen et al.
5,183,569 A * 2/1993 Kyriacou ...................... 210/636
5,348,651 A    9/1994 Carlson et al.
(Continued)

FOREIGN PATENT DOCUMENTS

CN       1178480 A      4/1998
WO       WO 96/28236    9/1996

OTHER PUBLICATIONS

Search Report dated Oct. 9, 2013 issued on corresponding Chinese patent application No. 201080028810.8.
(Continued)

*Primary Examiner* — John K Fristoe, Jr.
*Assistant Examiner* — Christopher Ballman
(74) *Attorney, Agent, or Firm* — Parks Wood LLC; Collen A. Beard, Esq.

(57) ABSTRACT

A simulator device configured to replace a filtration unit in a crossflow filtration system comprises a feed inlet (41), a first flow path (43) connected to the feed inlet (41) for simulating a retentate flow in the filtration unit, and a second flow path (44) connected to the feed inlet (for simulating a permeate flow in the filtration unit. Adjustable valve means (45, 46) are provided for controlling at least one of the simulated retentate flow and the simulated permeate flow.

15 Claims, 6 Drawing Sheets

(56) References Cited

U.S. PATENT DOCUMENTS

| | | | |
|---|---|---|---|
| 5,717,147 A * | 2/1998 | Basch et al. | 73/863.23 |
| 5,906,732 A * | 5/1999 | Kohno | 210/94 |
| 5,985,160 A * | 11/1999 | DiLeo et al. | 210/785 |
| 6,047,729 A * | 4/2000 | Hollister et al. | 137/557 |
| 6,325,103 B1 * | 12/2001 | Cox | 137/883 |
| 7,025,329 B2 * | 4/2006 | Winter | 251/218 |
| 7,563,363 B2 * | 7/2009 | Kuzma | 210/143 |
| 7,828,728 B2 * | 11/2010 | Boock et al. | 600/365 |
| 8,886,273 B2 * | 11/2014 | Li et al. | 600/345 |
| 2002/0134716 A1 | 9/2002 | Maartens et al. | |
| 2002/0139741 A1 * | 10/2002 | Kopf, III | 210/224 |
| 2003/0150198 A1 * | 8/2003 | Illingworth et al. | 55/406 |
| 2003/0185974 A1 * | 10/2003 | Serafin et al. | 427/180 |
| 2008/0216898 A1 * | 9/2008 | Grant et al. | 137/154 |

OTHER PUBLICATIONS

Rahimi, M., et al., Journal of Membrane Science, 255 (2005) 23-31.

Memberane Separations Technology Principles and Applications; Richard D. Noble; Membrane Science and Technology Series, 2; Elsevier (1995).

* cited by examiner

(prior art)

SIMULATOR DEVICE

CROSS-REFERENCE TO RELATED APPLICATIONS

This application is a filing under 35 U.S.C. §371 and claims priority to international patent application number PCT/SE2010/050672 filed Jun. 16, 2010, published on Dec. 29, 2010 as WO 2010/151212, which claims priority to application number 0950481-2 filed in Sweden on Jun. 23, 2009.

FIELD OF THE INVENTION

The present invention relates to crossflow filtration, and more particularly to a simulator device designed to replace a filtration unit in a crossflow filtration apparatus or system.

BACKGROUND OF THE INVENTION

For the separation of suspended solids from a fluid by filtration, two basic configurations are used, direct-flow filtration (also called normal flow filtration) and crossflow filtration (also called tangential flow filtration).

In direct-flow filtration, fluid is introduced perpendicularly to the filter surface and then passes directly through the filter.

In crossflow filtration, on the other hand, a fluid flow is passed tangentially along the filter surface. Particles smaller than the pore size of the filter pass through the membrane as a permeate (filtrate), while everything else is retained on the feed side of the membrane as a retentate. Usually the fluid flow is recirculated across the filter surface. Since the retained products are swept along the surface by the tangential flow and do not build up at the filter surface as in direct-flow filtration, a crossflow filter can operate continuously at relatively high solids loads without being blocked by solids material.

Depending on the pore size of the filter, typically a membrane, crossflow filtration is classified as either a microfiltration (MF) or ultrafiltration (UF) process. Filter membrane configurations include flat-sheet membranes, which are usually used in plate and frame-type cassettes, spiral-wound module formats and hollow fibre modules. A filter cassette typically comprises a stacked assembly of porous membrane components and filtrate and retentate flow screen components. In a filtration module, several such filter cassettes are usually used.

A crossflow filtration system typically includes a filtration module, a feed tank, a pump for feeding liquid from the feed tank to the filtration module via a feed line, a return line for circulating retentate back to the feed tank, a valve in the retentate return line for applying pressure, and a permeate line for removing permeate from the filtration module.

Performing non-process activities on such a system, such as during installation, functional testing or simulation of different methods is today used either with the normal filtration module in place or with the system components disassembled and with tubes and external valves connected. In the former case, some process parameters, including back pressure from feed to retentate and flow rate from filtration module to permeate line can not be varied. There is also a risk of damaging the filter membrane assembly. The alternative of using disassembly of system components, on the other hand, is rather complicated and requires substantial additional space.

U.S. Pat. No. 4,846,970 discloses a crossflow filtration membrane test unit which can be used to test the performance and flow characteristics of filtration membranes. The device includes means for closely simulating the flow dynamics existing in a full-size crossflow filtration system.

It is an object of the present invention to provide means for simplifying and improving functional testing and other non-process activities on an operational full-size crossflow filtration system rather than testing filter membrane samples as in the above-mentioned U.S. Pat. No. 4,846,970.

SUMMARY OF THE INVENTION

The above and other objects and advantages are achieved by a device which is designed to replace a filtration unit, such as a filter cassette, in a crossflow filtration system and which can simulate different filter performance and characteristics, including the simulation of different back pressures and different permeate flow rates.

A simulator device according to the present invention is defined in claim 1. The simulator device, which is configured to replace a filter cassette in a crossflow filtration system, comprises a feed inlet, a first flow path connected to the feed inlet for simulating a retentate flow in the filtration unit, a second flow path connected to the feed inlet for simulating a permeate flow in the filtration unit, and adjustable valve means for controlling at least one of the simulated retentate flow and the simulated permeate flow. In a preferred embodiment, the first flow path comprises first adjustable valve means for controlling the simulated retentate flow, and the second flow path comprises second adjustable valve means for controlling the simulated permeate flow.

In another preferred embodiment, the first adjustable valve means are provided between the feed inlet, which preferably comprises a feed flow path, and the first flow path, and the second adjustable valve means are provided between the feed inlet and the second flow path.

Preferably, the simulator device is configured to replace a filter membrane cassette, typically a flatsheet filter membrane cassette, received in a cassette holder connecting the cassette to fluid inlet and outlets to thereby be connected to the fluid inlet and outlets.

Other preferred embodiments of the invention are defined in the dependent claims.

A more complete understanding of the present invention, as well as further features and advantages thereof, will be obtained by reference to the following detailed description and the accompanying drawings.

DETAILED DESCRIPTION OF THE INVENTION

In the following, terms such as "top", "bottom", "vertical", "horizontal", "outer", "inner", etc are used merely with reference to the geometry of the embodiment of the invention shown in the Figures and are not intended to limit the invention in any manner.

As mentioned above, the present invention relates to a device designed to replace a filtration unit, such as a filter membrane cassette, in a crossflow filtration system, e.g. during installation testing or simulation of different methods, and which can simulate various flow conditions of a filtration unit which may exist in operation. For a better understanding of the context in which the present invention is intended to be used, a crossflow filtration system will first be briefly described.

Figure 1:
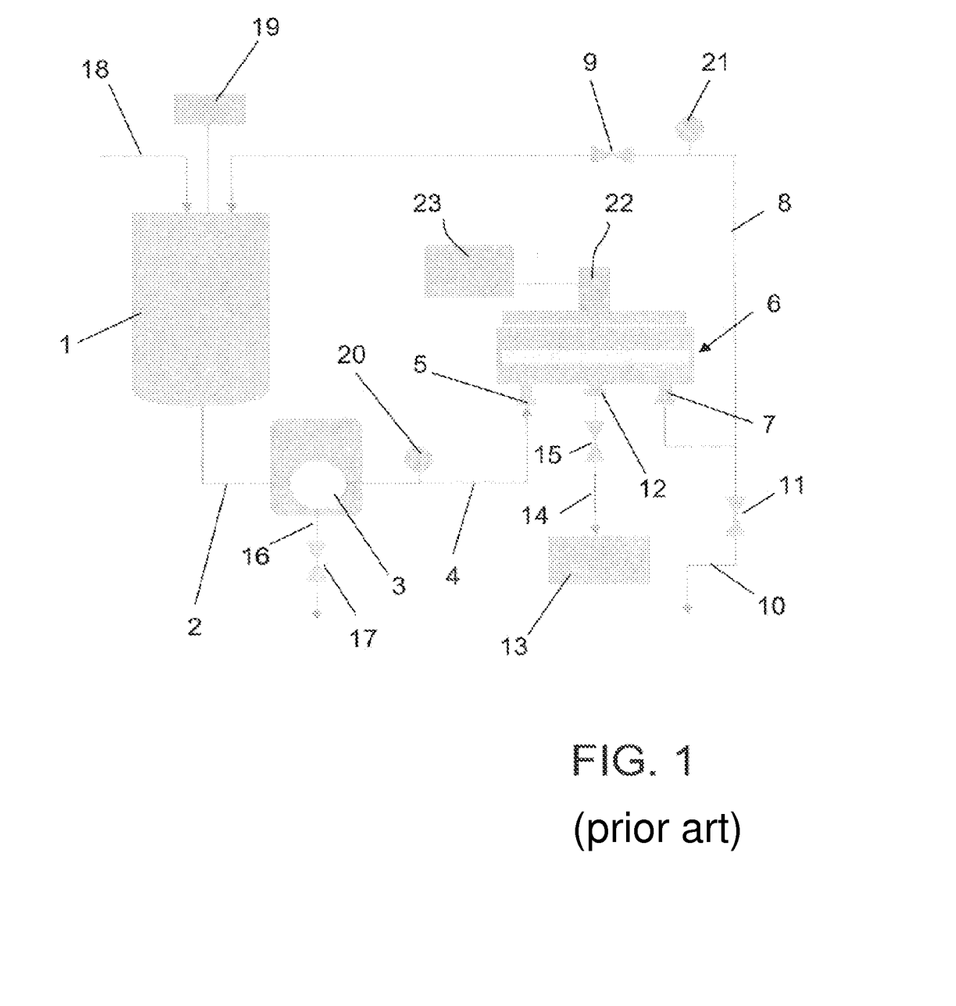
FIG. 1 is a schematic diagram of a basic crossflow filtration system.

An exemplary basic crossflow filtration system is depicted in FIG. 1. The system comprises a feed tank 1 which via a line 2 is connected to a pump 3, which in turn via a feed line 4 is connected to an inlet 5 of a filtration module 6. A retentate outlet 7 of the filtration module 6 is connected (i) to the feed tank 1 via a retentate return line 8 and a valve 9, and (ii) to drain via a line 10 with a valve 11. A permeate outlet 12 of the filtration module 6 is connected to a permeate collection vessel 13 via a permeate line 14 with a valve 15. The pump 3 is further coupled to a drain and product recovery line 16 with a valve 17. A supply line for tank 1 is designated at 18, and a vent for the tank at 19. A feed pressure gauge 20 is mounted to feed line 4, and a retentate pressure gauge 21 is mounted to retentate line 8. Usually, a pressure gauge is also mounted to permeate line 14 between the permeate outlet 12 and valve 15. In the illustrated case, the filtration module 6 comprises one or more filter cassettes clamped between a flow distribution manifold and a backing plate, respectively, of a filter cassette holder, as will be described in more detail below, the backing plate being actuated by a hydraulic cylinder 22 via a hydraulic pump 23.

Figure 2:
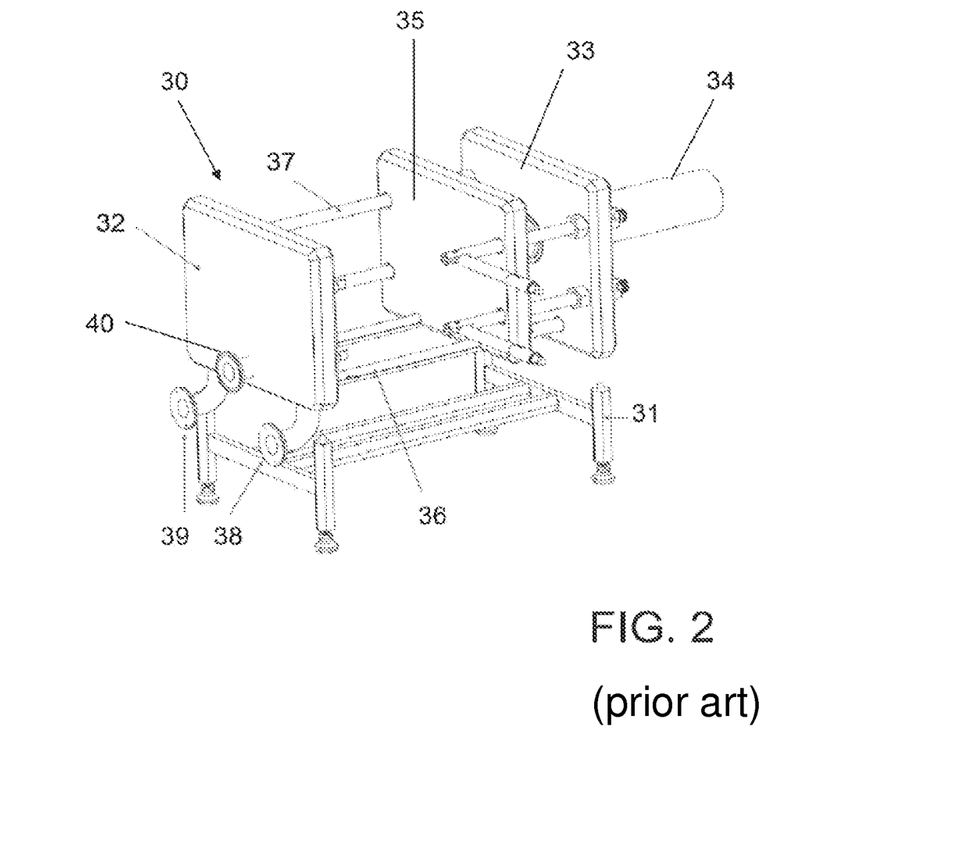
FIG. 2 is an isometric perspective view of a filter membrane cassette holder.

A commercial filter cassette holder (Kvick™ Flow cassette holder, GE Healthcare Bio-Sciences AB, Uppsala, Sweden) is shown in FIG. 2. The cassette holder 30, which is supported on a stand 31, comprises a flow distribution manifold 32, a mounting plate 33 for a hydraulic cylinder 34, and a backing plate 35 operatively coupled to the hydraulic cylinder 34 and slideably mounted on cassette support bars 36 and guide rods 37. The flow distribution manifold 32 has feed and retentate ports 38 and 39, respectively, and a permeate port 40 which are connected to respective outlets and inlets (not shown) on the inner side of the flow distribution manifold 32. On one side of the holder, the guide rods 37 consist of two hinged parts, wherein the fore part of each rod can be released from flow distribution manifold 32 by sliding back a sleeve and pulled out (as illustrated) to permit insertion of one or more filter cassettes (not shown) into the cassette holder. The backing plate 35 is then slid against the filter cassette(s) and the hydraulic cylinder 34 is pressurized to hold the filter cassette(s) firmly against the flow distribution manifold 32 with its feed/retentate and permeate channel openings aligned with the corresponding channel openings of the filter cassette(s).

With reference again to FIG. 1, when the outlined crossflow filtration system is in operation, the pump 3 generates a flow of feed liquid through the filtration module 6, resulting in the applied pressure forcing a portion of the liquid through the filter membrane(s) into a permeate stream in line 14 during each pass. The rest of the feed liquid is recirculated to the tank 1, from which it is again pumped into the filtration module 6, and so on.

As the pores in the filter become plugged, the flow through the filter is reduced, resulting in a pressure increase, and the filter will eventually need to be replaced when the pressure gets too high or the flow rate too low.

Crossflow filtration has a variety of industrial applications, including e.g. filtration of solutions containing biomolecules, or particles such as viruses, bacteria or cellular material.

Now to the present invention, which as mentioned above, relates to a simulator device designed to replace a filtration unit, such as a filter cassette, in a crossflow filtration system. The simulator device is constructed to act as a crossflow filter in the sense that it comprises flow paths which will direct the fluids in a corresponding way as the filtration unit, i.e. that the feed flow will be directed as a permeate flow out of the filtration system and/or a retentate flow which is recirculated back into the system, one or, preferably, both the permeate and the retentate flow rates being controllable by respective valve means.

Figure 3:
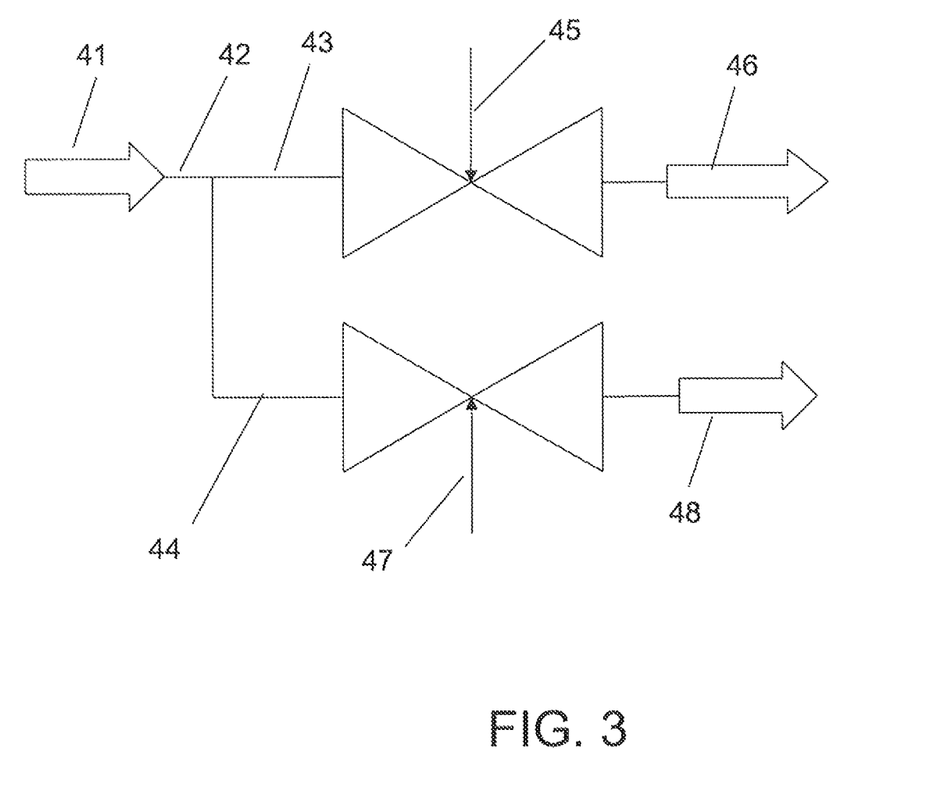
FIG. 3 is a schematic flow diagram for an embodiment of a simulator device according to the present invention.

This is schematically illustrated for a basic embodiment by the flow diagram in FIG. 3. A feed flow 41 is introduced into a feed flow path 42 which branches into a retentate flow path 43 and a permeate flow path 44. The retentate flow path 43 has adjustable valve means 45 for providing a controllable retentate flow 46 to be recirculated to the filtration system. In a corresponding manner, the permeate flow path has adjustable valve means 47 for providing a controllable permeate flow 48 out of the filtration system.

By adjustment of the valve means 45, 47, the counter pressure (back pressure) of and thereby the fluid flows through the filtration system can be varied. More particularly, by adjusting valve means 45, the back pressure and the retentate flow 46 are controlled, and adjustment of valve means 47 controls the permeate flow 48. Variation of the back pressure will also affect the permeate flow.

It is appreciated that by means of the simulator device, a large variety of different flow conditions in a crossflow filtration system can conveniently be simulated, this being done without complicated disassembly of system components and without risking damaging a crossflow filtration unit. Specifically, different back pressures from feed to retentate and different permeate flow rates can be simulated.

Such flow condition simulation can be used for a variety of purposes. For example, functional testing of the filtration system may be performed. The flow and/or pressure of different parts of a crossflow filtration system under different conditions can be measured. Methods may be simulated and optimised. Varying degrees of filter plugging may be simulated. Control systems for crossflow filtration can be checked as to their capability to maintain desired control parameters.

As is readily seen, such a simulator device will be useful in filtration system installation and maintenance as well as in training.

While a single valve is typically used in the each of the retentate flow path 43 and the permeate flow path 44, two (or optionally more) valves may be used in one or both flow paths. For example, a first valve may be used for coarse control of the flow and a second valve may be used for fine control.

A variety of different valve types may be used, and suitable valves can readily be selected by a person skilled in the art. Exemplary valves include seat valves (such as needle valves, disk valves, mushroom valves), sliding valves, membrane valves.

It is appreciated that a simulator device according to the present invention as described above may be embodied in a variety of different configurations and designs. A more detailed embodiment of the simulator device is shown in FIGS. 4 to 7, in which the simulator device is designed to replace a crossflow filtration membrane cassette in cassette holder of the type shown in FIG. 2 and briefly described above.

Figure 4:
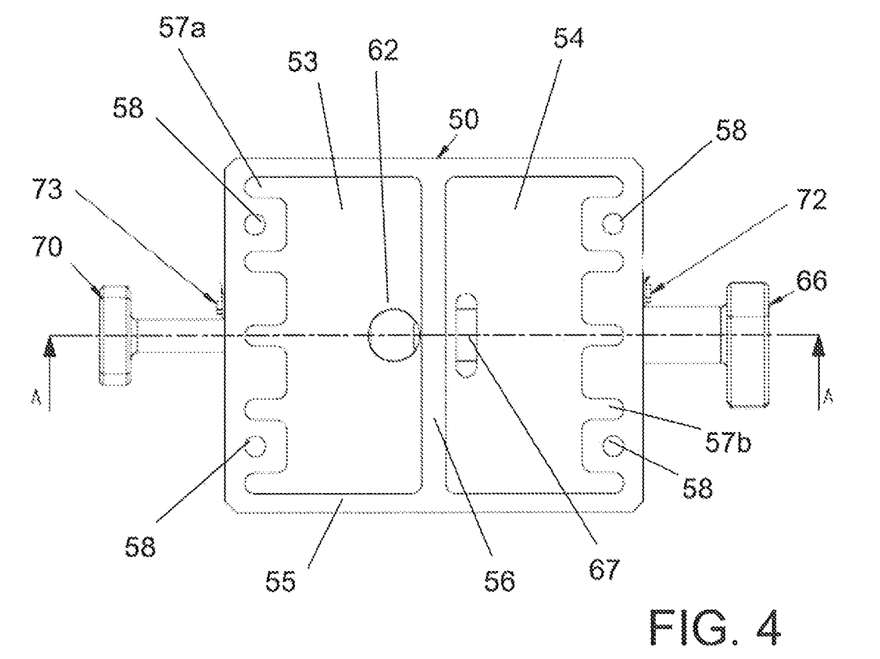
FIG. 4 is a plan view of one face of an embodiment of a simulator device according to the present invention.

To this end the simulator device includes a generally rectangular (plate-shaped) material body 50 having first face 51, hereinafter referred to as feed/retentate face, and a second face 52, hereinafter referred to as permeate face. The feed/retentate face 51 has a first recess or cavity 53 and a second recess or cavity 54, which are defined by a peripheral wall 55 and a partition wall 56 portion with planar top surfaces.

Two opposite side portions of peripheral wall 55 (to the left and right in FIG. 4) are broader and each have a "toothed" configuration with (here five) indentations, corresponding to sideways protrusions 57a of recess 53 and 57b of recess 54. There are further (here) two through-bores or apertures 58 in each of these two opposite side portions of wall 55, each bore extending to the permeate face 52 of the body 50.

Figure 5:
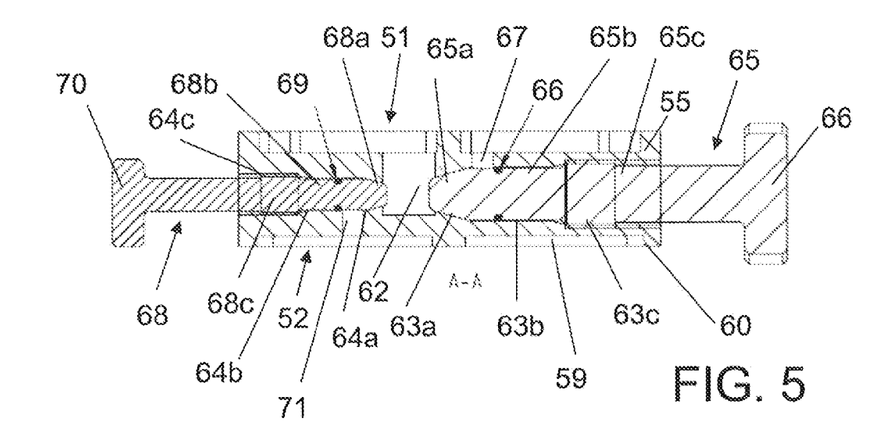
FIG. 5 is a cross-sectional view taken along A-A in FIG. 4.
Figure 6:
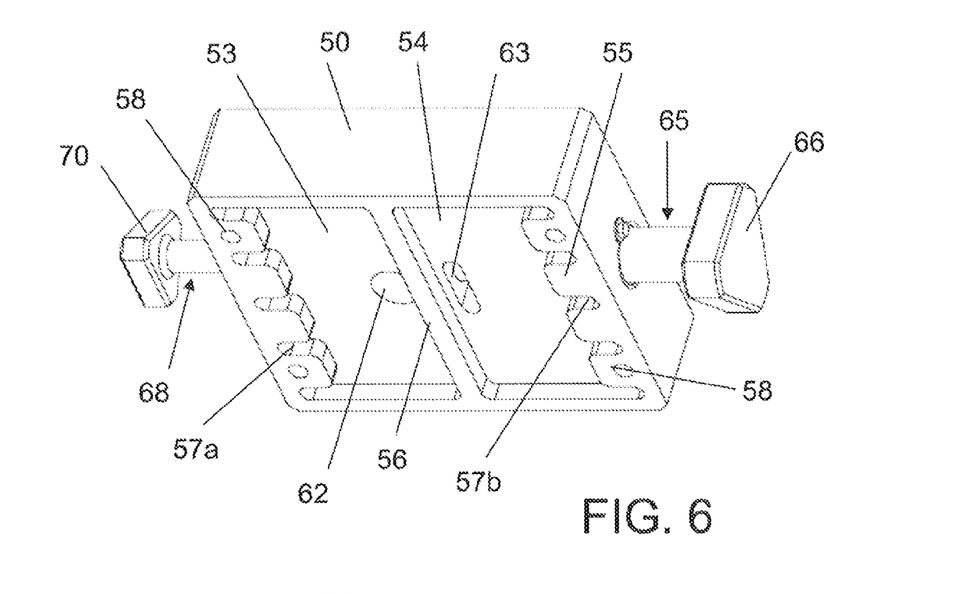
FIG. 6 is an isometric perspective view of the embodiment shown in FIGS. 4 and 5.
Figure 7:
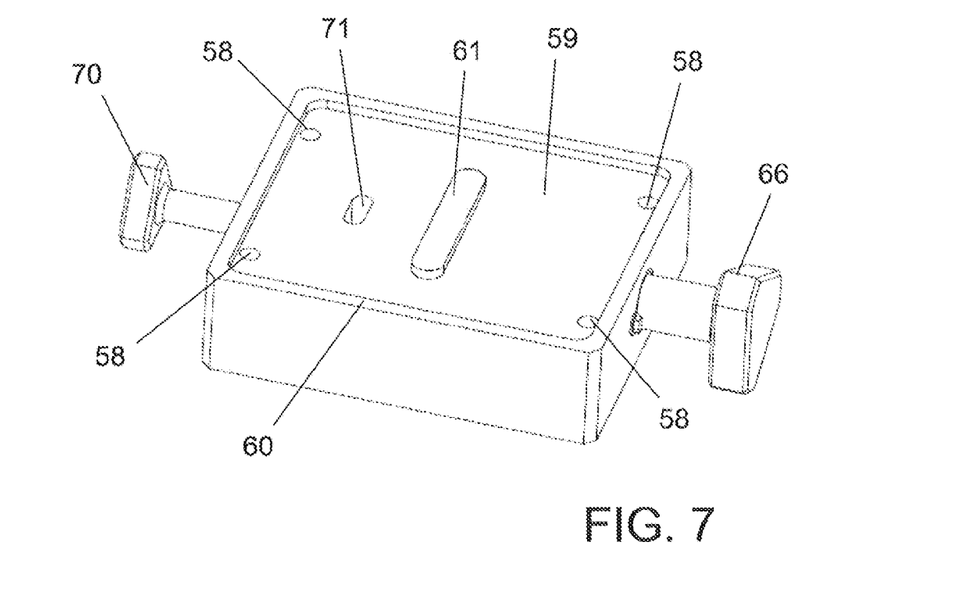
FIG. 7 is an opposite perspective view to that shown in FIG. 6.

With reference to FIGS. 5 and 7, the permeate face 52 has a recess or cavity 59 defined by a peripheral wall 60 with a planar top surface, the four through-bores 58 opening in respective corners of the bottom of recess 59. Centrally in recess 59 there is provided a planar support strip 61 of the same height as peripheral wall 60.

When the simulator device is placed in a flat-sheet membrane cassette holder of the type illustrated in FIG. 2, the feed/retentate face 51 is applied against distribution manifold 32 via an appropriate gasket (e.g. of silicone—not shown), and the backing plate 35 is pressed against the permeate face 52 of body 50 via an appropriate gasket (e.g. of silicone—not shown). On the feed/retentate face 51 of the body 50, the top surfaces of peripheral wall 55 and partition wall 56 act as sealing surfaces. In corresponding manner, on the permeate face 52 the top surfaces of peripheral wall 60 and support strip 61 act as sealing surfaces.

The outwardly open recesses or cavities 53, 54 and 59 in the two opposed body faces 51 and 52 will thereby be closed defining corresponding flow chambers, as will be described in more detail below.

Further, when the simulator device body 50 is correctly placed in the cassette holder (FIG. 2), the bores 58 are aligned with respective permeate channel openings (not shown) on the inner surface of distribution manifold 32. Simultaneously, the recess protrusions 57a are aligned with respective feed channel openings (not shown) on the inner surface of distribution manifold 32. Thereby, the flow chamber corresponding to recess 53 communicates with the feed inlet port 38, and the flow camber corresponding to recess 54 communicates with the retentate port 39 of the distribution manifold 32 of the cassette holder (FIG. 2). Likewise, the flow chamber corresponding to recess 59 on the opposite side of the body 50 communicates with permeate port 40 of the distribution manifold 32.

As can best be seen in FIG. 5, recess 53 has a vertical bore 62 crossing first and second horizontal bores 63 and 64, respectively, in the body 50 so that the two horizontal bores both open into bore 62.

The horizontal bore 63 has a tapering inner end portion 63a, a central portion 63b and a threaded end portion 63c. A needle type valve shaft 65 is mounted in the bore 63 to form a needle type valve therewith. More specifically, the bore portion 63a forms a seat for a cone portion 65a of valve shaft 65, and a threaded screw portion 65c engages the threaded bore portion 63c. An intermediate portion 65b of the valve shaft has an o-ring 66 received in an annular recess for sealing against the inner wall of bore portion 63b. Outside the body 50, the valve shaft 65 is provided with a handling knob 66.

A vertical (here elongated) bore 67 in the body 50 adjacent to the valve seat 63a connects the second recess 54 on the feed/retentate face of the body 50 with the horizontal bore 63. In FIG. 5, the valve is shown in closed condition, i.e. the inner opening of horizontal bore 63 is closed. By adjustment of the valve shaft cone 65a in valve seat 63a via the handling knob 66, the vertical bore 62 can be made to communicate to varying degrees with recess 54 via the bore 67.

In a corresponding manner, the horizontal bore 64 has a tapering inner end portion 64a, a central portion 64b and a threaded end portion 64c. A needle type valve shaft 68 is mounted in the bore 64 to form a needle type valve therewith, the bore portion 64a forming a seat for a cone portion 68a of valve shaft 68. A threaded screw portion 68c engages the threaded bore portion 64c. An intermediate portion 68b of the valve shaft has an o-ring 69 received in an annular recess for sealing against the inner wall of bore portion 64b. Outside the body 50, the valve shaft 68 is provided with a handling knob 70.

A vertical bore 71 in the body 50 adjacent to the valve seat 64a connects the recess 59 on the permeate face 52 of the body 50 with the horizontal bore 64. In FIG. 5, the valve is shown in closed condition, i.e. the inner opening of horizontal bore 64 is closed. By adjustment of the valve shaft cone 68a in valve seat 64a via the handling knob 70, the vertical bore 62 can be made to communicate to varying degrees with recess 59 via the bore 71. Reference numerals 72 and 73 in FIG. 4 designate optional bolt/washer assemblies to prevent unintentional unthreading of the valve shafts 65 and 68.

The simulator device may be made of various materials apparent to the skilled person. Exemplary materials for the body and valves are metals, e.g. steel, and plastics, e.g. polypropene (PP).

As mentioned above, when the simulator device is mounted in the filter cassette holder (FIG. 2), closed flow chambers are defined on the feed/retentate and permeate sides, respectively, of the simulator body 50. Specifically, the first recess 53 on the feed/retentate side forms a first flow chamber which may be termed feed chamber, and the second the recess 54 forms a second flow chamber which may be termed retentate chamber. In corresponding manner, the recess 59 on the permeate side of the body 50 forms a third flow chamber which may be termed permeate chamber.

Together, the feed chamber 53, vertical bore 62, horizontal bore 63, vertical bore 67 and the retentate chamber 54 form a feed/retentate flow path which is controllable by adjustment of the needle type valve formed by horizontal bore 63 and valve shaft 65 and here termed retentate valve. Likewise, the feed chamber 53 together with vertical bore 62, horizontal bore 64 vertical bore 71, permeate chamber 59 and bores 58 form a feed/permeate flow path which is controllable by adjustment of the needle type valve formed by horizontal bore 64 and valve shaft 68 and here termed permeate valve.

With reference to the description above with respect to FIG. 3, the "feed flow path" referred to is formed by flow chamber 53 and vertical bore 62, the "retentate flow path" is formed by horizontal bore 63, vertical bore 67 and flow chamber 54, and the "permeate flow path" is formed by horizontal bore 64, vertical bore 71, flow chamber 59 and through-bores 58. As described above, by adjustment of the retentate valve and the permeate valve, different back/pressure and flow conditions of a crossflow filter cassette can easily be simulated.

Figure 8:
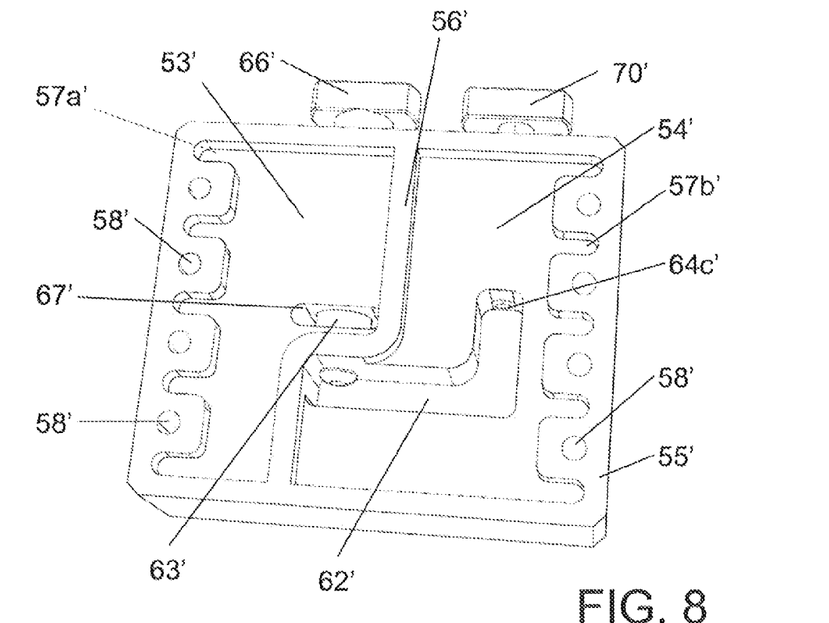
FIG. 8 is an isometric perspective view of another embodiment of the device according to the present invention.
Figure 9:
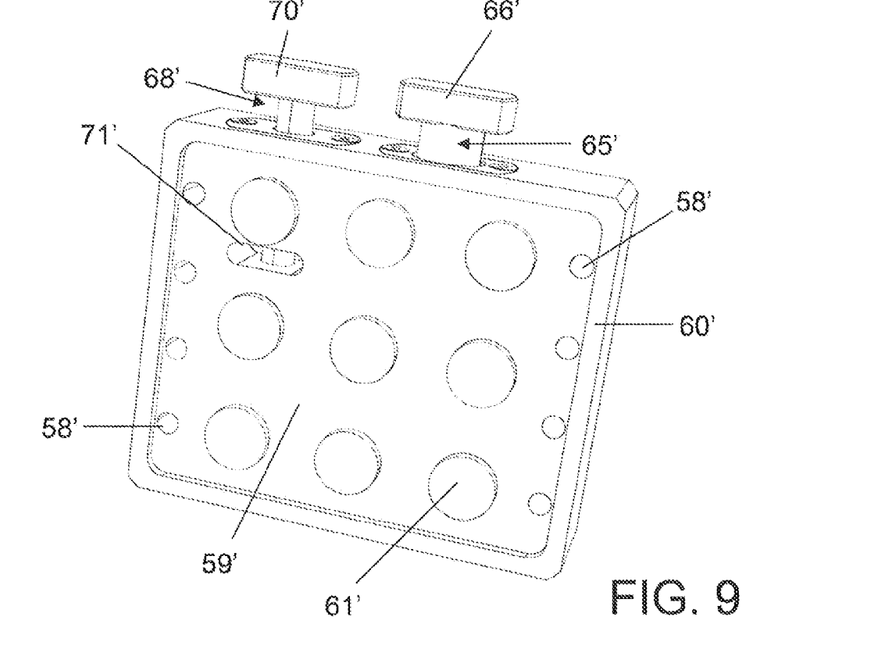
FIG. 9 is an opposite perspective view to that shown in FIG. 8.

FIGS. 8 and 9, in which corresponding parts have the same, but primed, reference numerals as in FIGS. 4 to 7, show another embodiment of the simulator device designed so that both valve shafts are mounted in parallel on one side of the simulator body and therefore accessible for adjustment from the same side (which may be advantageous in at least some situations). Here this has been realized by replacing the vertical bore 62 in the embodiment shown in FIGS. 4 to 7 by a recess 62' of L-shaped configuration and having parallel horizontal bores 63', 64' open at respective ends of the shanks or legs thereof. Alternatively, horizontal bores 63', 64' could, of course, each open into a respective separate vertical bore (which may or may not be connected to each other). Further, support rib 61 of the embodiment shown in FIGS. 4 to 7 has been replaced by a plurality of support disks 61'. The embodiment of FIGS. 8 to 9 further differs from that shown in FIGS. 4 to 7 by having four permeate openings 58' on each side (rather than two).

In the embodiments specifically described above, various modifications obvious to the skilled person can be made. For example, the location and configuration of the recesses or cavities, vertical and horizontal bores, the partition wall and the valves may be varied within wide limits. Also, the outwardly open recesses on the feed/retentate face and permeate face, respectively of the simulator body 50 may optionally be replaced by a number of separate channels. Furthermore, the body may have flow chambers or flow channels enclosed therein rather than open recesses or channels to be closed by the distribution manifold and backing plate of the filter cassette holder.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A simulator device configured to replace a filtration unit in a crossflow filtration system, comprising:
    a feed inlet,
    a first flow path connected to the feed inlet for simulating a retentate flow in the filtration unit,
    a second flow path connected to the feed inlet for simulating a permeate flow in the filtration unit, and
    adjustable valve means for controlling a back pressure and at least one of recirculation of the simulated retentate flow to the crossflow filtration system and circulation of the simulated permeate flow out of the crossflow filtration system, wherein the simulator device is configured to perform simulations within the crossflow filtration system without the filtration unit.

2. The simulator device of claim 1, wherein the first flow path comprises first adjustable valve means for controlling the simulated retentate flow, and the second flow path comprises second adjustable valve means for controlling the simulated permeate flow.

3. The simulator device of claim 2, wherein each of the first and second adjustable valve means comprise at least one valve.

4. The simulator device of claim 3, wherein the at least one valve is selected from seat valves, sliding valves and membrane valves.

5. The simulator device of claim 4, wherein the at least one valve comprises a needle valve.

6. The simulator device of claim 1, wherein the feed inlet comprises a feed flow path.

7. The simulator device of claim 6, wherein the feed flow path is connected to the first flow path via the first adjustable valve means, and to the second flow path via the second adjustable valve means.

8. The simulator device of claim 6, wherein the feed flow path comprises at least one cavity.

9. The simulator device of claim 1, wherein the simulator device is configured to replace a filter membrane cassette received in a cassette holder connecting the cassette to fluid inlet and outlets thereof to thereby be connected to the fluid inlet and outlets.

10. The simulator device of claim 9, wherein the filter membrane cassette is a flatsheet filter membrane cassette.

11. The simulator device of claim 9, wherein each cavity is outwardly open and configured to be closed to form a corresponding chamber when the simulator device is mounted in the cassette holder.

12. The simulator device of claim 11, comprising a plate shaped body, one face of which comprises a first cavity forming part of said feed flow path and a second cavity forming part of said first, retentate flow simulating flow path, wherein the first cavity is connectable to the second cavity via said first adjustable valve means, and an opposite face of which comprises a third cavity forming part of said second, permeate flow simulating flow path, wherein the first cavity is connectable to the third cavity via said second adjustable valve means.

13. The simulator device of claim 1, wherein the first and second flow paths each comprise at least one cavity.

14. The crossflow filtration system of claim 1, further comprising a feed line, a retentate return line and a permeate line.

15. The crossflow filtration system of claim 1, arranged for performing tangential flow filtration.

* * * * *